US012726032B2

(12) United States Patent
Takahashi et al.

(10) Patent No.: US 12,726,032 B2
(45) Date of Patent: Sep. 1, 2026

(54) POWER CONTROL SYSTEM

(71) Applicant: Fujita Corporation, Tokyo (JP)

(72) Inventors: Yasufumi Takahashi, Tokyo (JP); Mitsuyoshi Ishikawa, Tokyo (JP)

(73) Assignee: FUJITA CORPORATION, Tokyo (JP)

( * ) Notice: Subject to any disclaimer, the term of this patent is extended or adjusted under 35 U.S.C. 154(b) by 0 days.

(21) Appl. No.: 19/033,801

(22) Filed: Jan. 22, 2025

(65) Prior Publication Data

US 2025/0167559 A1 May 22, 2025

Related U.S. Application Data

(63) Continuation of application No. PCT/JP2023/016197, filed on Apr. 25, 2023.

(30) Foreign Application Priority Data

Aug. 9, 2022 (JP) ................................ 2022-127416

(51) Int. Cl.
*H02J 3/38* (2026.01)
*H02J 3/32* (2026.01)
(Continued)

(52) U.S. Cl.
CPC ................ *H02J 3/381* (2013.01); *H02J 3/32* (2013.01); *H02J 15/50* (2026.01); *H02J 2101/24* (2026.01); *H02J 2101/30* (2026.01)

(58) Field of Classification Search
None
See application file for complete search history.

(56) References Cited

U.S. PATENT DOCUMENTS

2007/0132425 A1* 6/2007 Gjini .................. H01M 16/003 320/101
2012/0267952 A1* 10/2012 Ballatine ................ H02J 3/381 307/26

(Continued)

FOREIGN PATENT DOCUMENTS

CN 106160022 A 11/2016
CN 211790787 U 10/2020

(Continued)

OTHER PUBLICATIONS

English translation of Written Opinion issued in International Appln. No. PCT/JP2023/016197, mailed Jul. 25, 2023.

(Continued)

*Primary Examiner* — Daniel C Puentes
*Assistant Examiner* — Aqeel H Bukhari
(74) *Attorney, Agent, or Firm* — ROSSI, KIMMS & McDOWELL LLP

(57) ABSTRACT

The electric power control system includes an electric power generation mechanism using renewable energy, a first DC bus line connected to the electric power generation mechanism and corresponding to a first voltage, a DC/DC converter connected to the first DC bus line and capable of converting the first voltage into a second voltage lower than the first voltage, a second DC bus line connected to the DC/DC converter and corresponding to the second voltage, a power generation apparatus electrically connected to the second DC bus line, and a power generation fuel generation apparatus electrically connected to the second DC bus line and connected to the power generation apparatus to generate fuel for use in power generation in the power generation apparatus.

8 Claims, 10 Drawing Sheets

(51) Int. Cl.
*H02J 15/50* (2026.01)
*H02J 101/24* (2026.01)
*H02J 101/30* (2026.01)

(56) References Cited

U.S. PATENT DOCUMENTS

2016/0329744 A1 11/2016 Werth et al.
2020/0280183 A1 9/2020 Yamashita et al.
2023/0155391 A1* 5/2023 Mitsunaga ................ H02J 3/46 307/24
2023/0208134 A1* 6/2023 Tsuno ....................... H02J 1/12 307/19

FOREIGN PATENT DOCUMENTS

JP 2011036101 A 2/2011
JP 2015233403 A 12/2015
JP 2022102861 A 7/2022
WO 2015105006 A1 7/2015
WO 2019103059 A1 5/2019

OTHER PUBLICATIONS

Extended European Search Report issued in European Application No. 23852180.1, mailed Nov. 11, 2025.
Decision to Grant a Patent issued in Japanese Application No. 2024-540263, mailed Dec. 2, 2025.
Office Action issued in Japanese Application No. 2024-540263 mailed Aug. 5, 2025. English machine translation provided.
International Search Report issued in International Appln. No. PCT/JP2023/016197, mailed Jul. 25, 2023. English translation provided.
Written Opinion issued in International Appln. No. PCT/JP2023/016197, mailed Jul. 25, 2023.

* cited by examiner 1A
10
Control device
100
23
DC/DC converter
Solar cell
21
20
33
DC/DC converter
Storage battery
31
30
110
DC/DC converter
120
DC/AC converter
90
Load
200
43
DC/DC converter
41
Water electrolysis device
40
53
DC/DC converter
51
Fuel cell
50
Hydrogen storage
45
63
DC/DC converter
61
Storage battery
60
73
DC/DC converter
71
Capacitor
70

1B
10
Control device
100
23
DC/DC converter
Solar cell
21
20
33
DC/DC converter
Storage battery
31
30
110
DC/DC converter
120
DC/AC converter
90
Load
210
DC/AC converter
200
43
DC/DC converter
41
Water electrolysis device
40
53
DC/DC converter
51
Fuel cell
50
Hydrogen storage
45
63
DC/DC converter
61
Storage battery
60
73
DC/DC converter
71
Capacitor
70

500
10
Control device
100
23
DC/DC converter
Solar cell
21
33
DC/DC converter
Storage battery
31
110
DC/DC converter
43
DC/DC converter
41
Water electrolysis device
111
DC/DC converter
53
DC/DC converter
51
Fuel cell
Hydrogen storage
45
120
DC/AC converter
90
Load

POWER CONTROL SYSTEM

CROSS-REFERENCE TO RELATED APPLICATIONS

This application is a Continuation of International Patent Application No. PCT/JP2023/016197, filed on Apr. 25, 2023, which claims the benefit of priority to Japanese Patent Application No. 2022-127416, filed on Aug. 9, 2022, the entire contents of which are incorporated herein by reference.

FIELD

The present disclosure relates to a power (electric power) control system.

BACKGROUND

In recent years, initiatives for the Sustainable Development Goals (SDGs) have been expanding. In addition, electric power control systems using renewable energy such as solar, wind, and geothermal power have attracted attention from conventional methods of producing power using fossil fuels such as oil, coal, and liquefied natural gas.

In this type of electric power control system, the generated power varies greatly depending on the weather, season, location, and the like. In addition, the power consumption of consumers (load) such as a house, a store, or the like also varies. Therefore, an excess or deficiency of power occurs depending on the power supply-demand balance between power generation and consumption. Therefore, in recent years, efforts have been made to stabilize power using a fuel cell or a water electrolysis device. International Patent Publication No. WO2019/103059 discloses a Direct Current (DC) bus control system using the fuel cell and the water electrolysis device.

In a typical electric power control system, each device is connected to one DC bus line via a DC/DC converter. Furthermore, in the case of a fuel cell and a water electrolysis device, a voltage specification value is lower than that of a power supply device, so that the DC bus line and each device need to be connected via two DC/DC converters. Therefore, in the case where the water electrolysis device and the fuel cell are electrically connected, a large power loss occurs.

SUMMARY

An object of the present disclosure is to provide an electric power control system capable of stabilizing power while suppressing power loss.

According to one embodiment of the present disclosure, a power control system is provided including an electric power generation mechanism using renewable energy, a first DC (Direct Current) bus line connected to the electric power generation mechanism and corresponding to a first voltage, a DC/DC converter connected to the first DC bus line and capable of converting the first voltage into a second voltage lower than the first voltage, a second DC bus line connected to the DC/DC converter and corresponding to the second voltage, a power generation apparatus electrically connected to the second DC bus line, and a power generation fuel generation apparatus electrically connected to the second DC bus line and connected to the power generation apparatus, which is configured to generate fuel for use in power generation in the power generation apparatus.

In the electric power control system, the electric power generation mechanism may be a solar cell.

The electric power control system may further include an electric power storage mechanism connected to the second DC bus line and storing electric power generated by the electric power generation mechanism.

In the electric power control system, the power generation apparatus may be a fuel cell, and the power generation fuel generation apparatus may be a water electrolysis device.

The electric power control system may further include a control device configured to control driving and termination of the power generation apparatus and the power generation fuel generation apparatus depending on a voltage value of a DC current in the first DC bus line.

The electric power control system may include a first DC/AC converter connected to the first DC bus line; a second DC/AC converter connected to the second DC bus line; and a load connected to the first DC/AC converter and the second DC/AC converter, and when the first DC bus line satisfies a predetermined condition, the control device may supply power to the load via the second DC/AC converter.

According to an embodiment of the present disclosure, it is possible to provide an electric power control system capable of stabilizing power while suppressing power loss.

DESCRIPTION OF EMBODIMENTS

Figure 1:
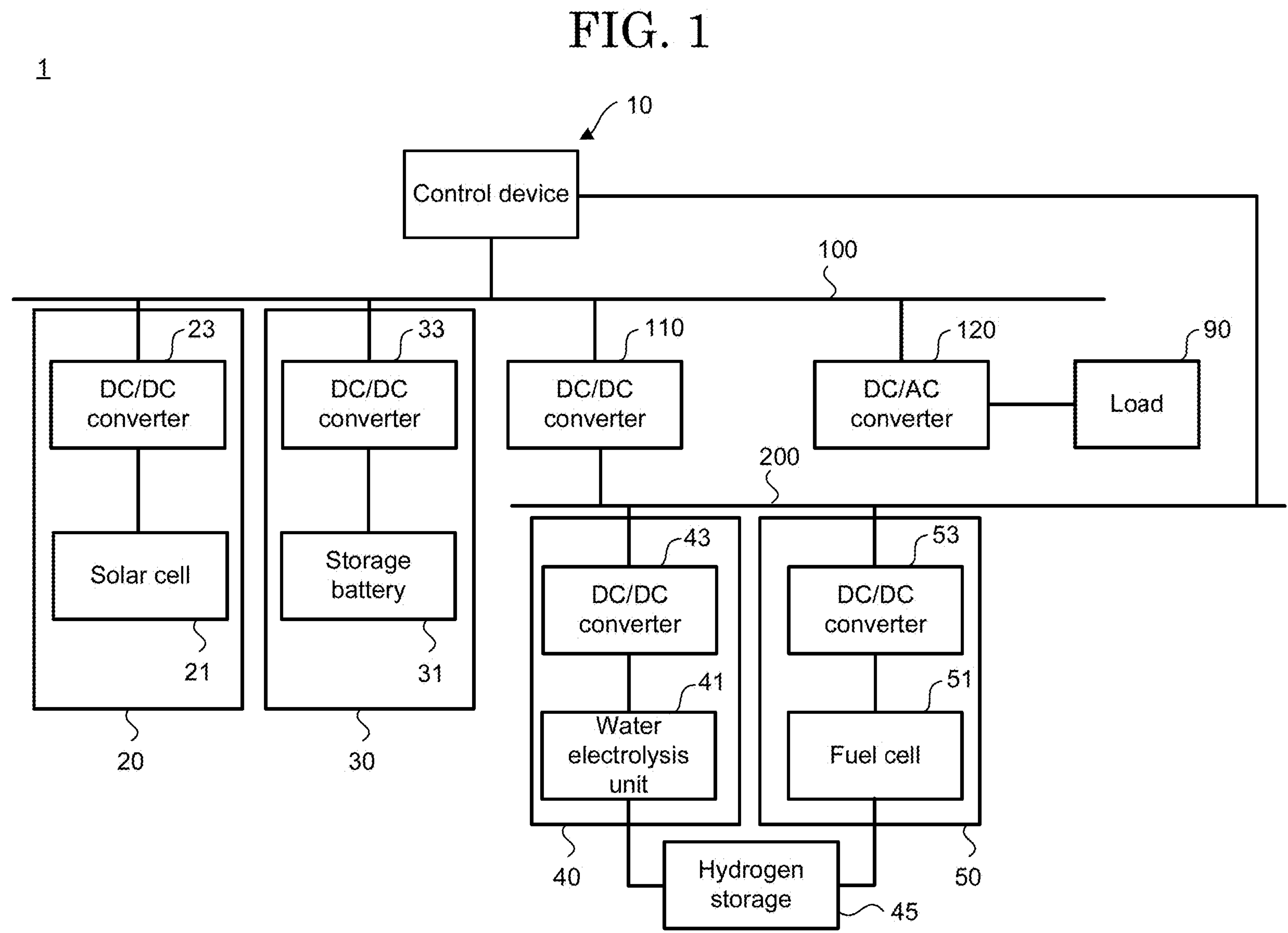
FIG. 1 is an overall configuration diagram of an electric power control system according to an embodiment of the present disclosure.

Hereinafter, embodiments of the present disclosure disclosed in the present application will be described with reference to the drawings. However, the present disclosure can be implemented in various forms without departing from the gist thereof, and should not be construed as being limited to the description of the following exemplary embodiments.

In the drawings referred to in the present embodiment, parts with the same or similar functions are denoted by the same reference signs or similar reference signs (only denoted by A, B, and the like after the numerals). In addition, for the convenience of description, the dimensional ratio of the drawings may be different from the actual ratio, or a part of the configuration may be omitted from the drawings.

Furthermore, although the term "voltage" is used in the present specification for the purposes of description, the voltage can be replaced with power or current, power can be replaced with current or voltage, or current can be replaced with voltage or power.

First Embodiment

1-1. Configuration of Electric Power Control System 1

Hereinafter, an electric power control system according to the present embodiment will be described with reference to the drawings.

FIG. 1 is an overall configuration diagram of an electric power control system 1 according to the present embodiment. As shown in FIG. 1, the electric power control system 1 includes a control device 10, a solar power generation unit 20, a storage battery unit 30, a water electrolysis unit 40, a fuel cell unit 50, a first DC bus line 100, a second DC bus line 200, a DC/DC converter 110, a DC/AC converter 120, and a load 90.

The solar power generation unit 20, the storage battery unit 30, the DC/DC converter 110, and the DC/AC converter 120 are directly connected to the first DC bus line 100.

The solar power generation unit 20 includes a solar cell 21 and a DC/DC converter 23. The solar cell 21 generates electric power using sunlight. The DC/DC converter 23 converts a voltage value of a DC current generated by the solar cell 21 so as to match a voltage value of a DC current of the first DC bus line 100.

The storage battery unit 30 includes a storage battery 31 and a DC/DC converter 33. The storage battery 31 stores electric power generated by the electric power control system. The DC/DC converter 33 converts the voltage value of the DC current flowing through the first DC bus line 100 so as to match a specified voltage of the storage battery 31 in order to store the surplus power in the electric power control system 1 in the storage battery 31.

The DC/DC converter 110 is connected to the first DC bus line 100 and the second DC bus line 200. The DC/DC converter 110 converts (lowers) the voltage value of the DC current flowing through the first DC bus line 100 so as to match a voltage value of a DC current flowing through the second DC bus line 200. In addition, the DC/DC converter 110 converts (boosts) the voltage value of the DC current flowing through the second DC bus line 200 so as to match the voltage value of the DC current in the first DC bus line 100. The DC voltage value flowing through the first DC bus line 100 corresponds to a first voltage. The voltage value flowing through the second DC bus line 200 corresponds to a second voltage. The second voltage is lower than the first voltage. In this example, the first voltage is 400 V and the second voltage is 48 V.

The DC/AC converter 120 converts the DC current flowing through the first DC bus line 100 into an AC (Alternating current) current. The load 90 indicates each device that consumes power. For example, examples of the load 90 include various electrical devices such as a television, an air conditioner, an electric lamp, a washing machine, a refrigerator, and a personal computer.

The water electrolysis unit 40 and the fuel cell unit 50 are electrically connected to the second DC bus line 200.

The water electrolysis unit 40 includes a water electrolysis device 41 and a DC/DC converter 43. The water electrolysis device 41 generates hydrogen by utilizing electrolysis of water. The generated hydrogen is stored in a hydrogen storage vessel/tank 45. The DC/DC converter 43 converts the voltage value of the DC current in the second DC bus line 200 so as to match a specified voltage value of the water electrolysis device 41.

The fuel cell unit 50 includes a fuel cell 51 and a DC/DC converter 53. The fuel cell 51 generates electric power by an electrochemical reaction using hydrogen generated in the water electrolysis device 41 and stored in the hydrogen storage vessel/tank 45. The DC/DC converter 53 converts the voltage value of the DC current generated by the fuel cell 51 so as to match the voltage value of the DC current of the second DC bus line 200.

In the above description, the water electrolysis device 41 and the fuel cell 51 are connected via the hydrogen storage vessel/tank 45. As a result, the fuel cell 51 can generate electric power using hydrogen supplied from the water electrolysis device 41. Therefore, since the water electrolysis device 41 can generate fuel for use in power generation for the fuel cell 51, it can be referred to as a power generation fuel generation apparatus.

1-2. Control Device

Figure 2:
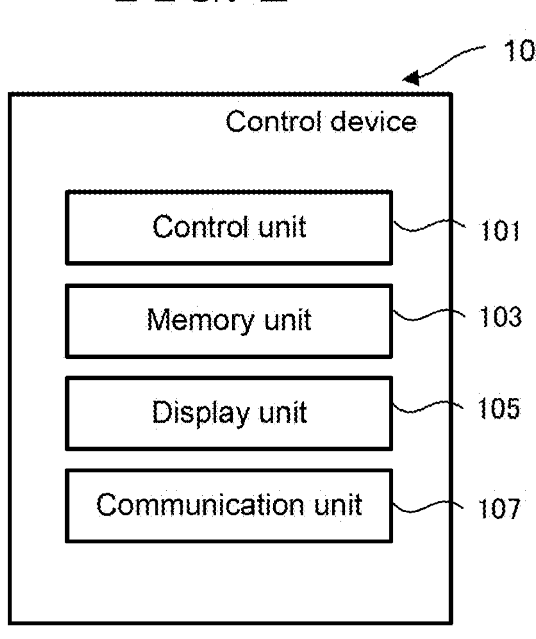
FIG. 2 is a block diagram of a control device according to an embodiment of the present disclosure.

FIG. 2 is a diagram of the control device 10. The control device 10 includes at least a control unit 101, a memory unit 103, a display unit 105, and a communication unit 107.

The control unit 101 controls driving of each unit of the electric power control system 1. For example, the control unit 101 includes a processor equipped with a calculation processing device exemplified by a CPU (Central Processing Unit) and memories exemplified by a ROM (Read On Memory) and a RAM (Random Access Memory). For example, the control unit 101 monitors the driving status of each unit, the voltage value of the DC current in the first DC bus line 100, and the voltage value of the DC current in the second DC bus line 200, and controls each device. By monitoring the voltage value of the DC current in the first DC bus line 100 and the voltage value of the DC current in the second DC bus line 200, the control unit 101 can detect an abnormality in the voltage value of the first DC bus line 100 and the voltage value of the second DC bus line 200, respectively.

In addition to a semiconductor memory such as a memory or an SSD (Solid State Drive), a magnetic recording medium (a magnetic tape, a magnetic disk, or the like), an optical recording medium, a magneto-optical recording medium, or a memory element that is a storage medium is used as the memory unit 103. The memory unit 103 has a function of storing a control program and various kinds of information used in the control program.

The display unit 105 displays control information under the control of the control unit 101. In this case, the display unit 105 may display the control information via a GUI (Graphical User Interface). Furthermore, in the case where the abnormality is detected in the electric power control system 1, the display unit 105 may display the abnormality information in the display unit. In addition, the display unit 105 may not necessarily be arranged depending on the aspect of the control device 10.

The communication unit 107 transmits and receives information to and from each device based on the control of the control unit 101.

Furthermore, a notification unit that notifies an abnormality may be arranged in the control device 10 in addition to the control unit 101, the memory unit 103, the display unit 105, and the communication unit 107. A light or a buzzer may be used as the notification unit.

Figure 3:
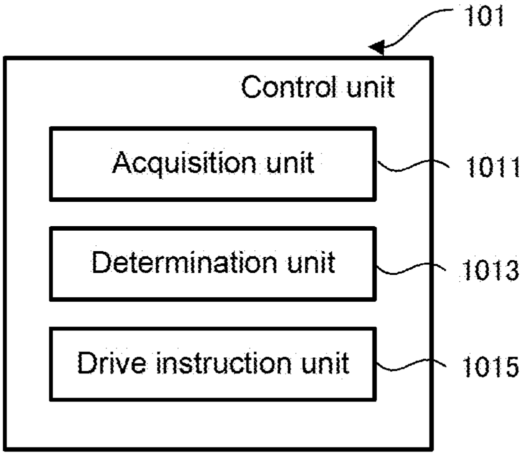
FIG. 3 is a functional block diagram of a control device according to an embodiment of the present disclosure.

FIG. 3 is a functional block diagram in the control unit 101. As shown in FIG. 3, the control unit 101 includes an acquisition unit 1011, a determination unit 1013, and a drive instruction unit 1015 as a functional unit.

The acquisition unit 1011 has a function of acquiring the voltage value of the DC current in the first DC bus line 100. In addition, the acquisition unit 1011 has a function of acquiring the voltage value of the DC current in the second DC bus line 200.

The determination unit 1013 has a function of determining whether the voltage value of the DC current satisfies a predetermined condition (whether the voltage is higher than a reference voltage).

The drive instruction unit 1015 has a function of instructing driving and termination of the water electrolysis device 41 and the fuel cell 51.

1-3. Electric Power Control Method

Figure 4:
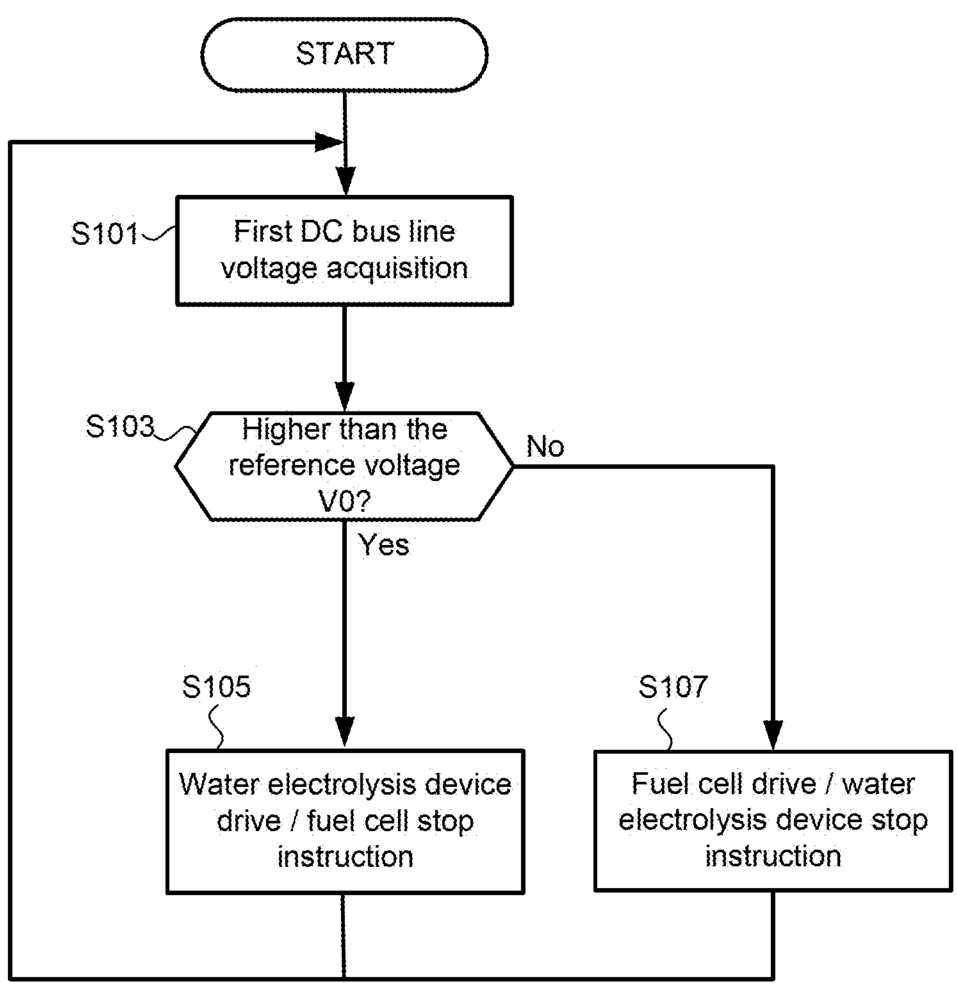
FIG. 4 is a flowchart of a control method according to an embodiment of the present disclosure.

Next, an electric power control method will be described. FIG. 4 is a flowchart of the electric power control method. FIG. 5A to FIG. 5C and FIG. 6A to FIG. 6B are schematic diagrams showing a relationship between time and voltage in the electric power control system 1.

Figure 5A:
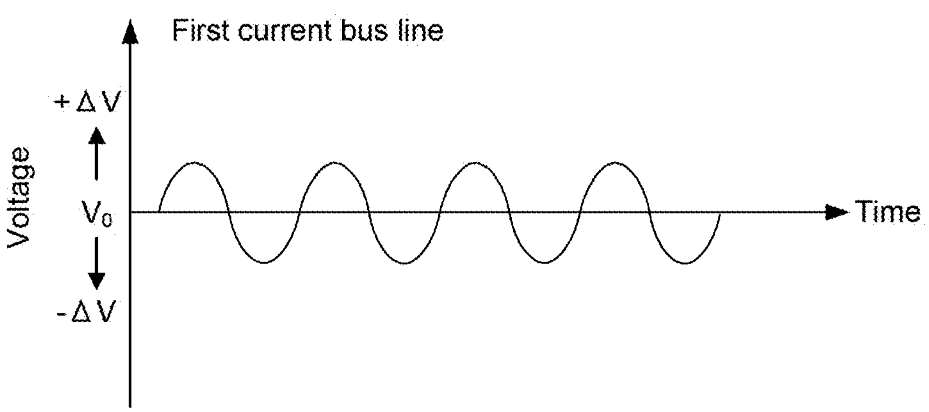
FIG. 5A is a schematic diagram showing a relationship between time and power in an electric power control system according to an embodiment of the present disclosure.

The control device 10 of FIG. 2 acquires the voltage value of the first DC bus line 100 (step S101). FIG. 5A is a schematic diagram showing a time variation of a voltage of the first DC bus line 100, and a schematic diagram showing a relationship between the time and a difference between the electric power from the solar power generation unit 20 of FIG. 1 and the electric power consumed by the load 90. As shown in FIG. 5A, the voltage of the first DC bus line 100 is constantly fluctuating. The control device 10 constantly acquires and monitors the voltage of the first DC bus line 100.

Next, the control device 10 determines whether the acquired voltage satisfies a predetermined condition. Specifically, the control device 10 determines whether the acquired voltage of the first DC bus line 100 is higher than a reference voltage $V_0$ (step S103).

Figure 5B:
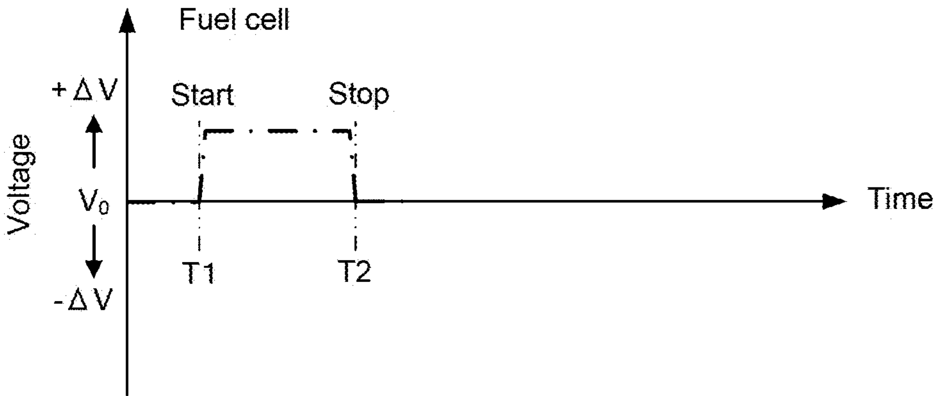
FIG. 5B is a schematic diagram showing a relationship between time and power in an electric power control system according to an embodiment of the present disclosure.

FIG. 5B is a schematic diagram showing a relationship between a voltage fluctuation and time in the driving of the fuel cell 51. As shown in FIG. 5B, when a fuel cell 51 is driven in a range from time T1 to time T2, the voltage increases from a reference voltage $V_0$ by $+\Delta V$. In other words, driving of the fuel cell 51 makes it possible to switch to a direction in which the voltage of the first DC bus line 100 in the electric power control system 1 is increased (replenishing the power).

Figure 5C:
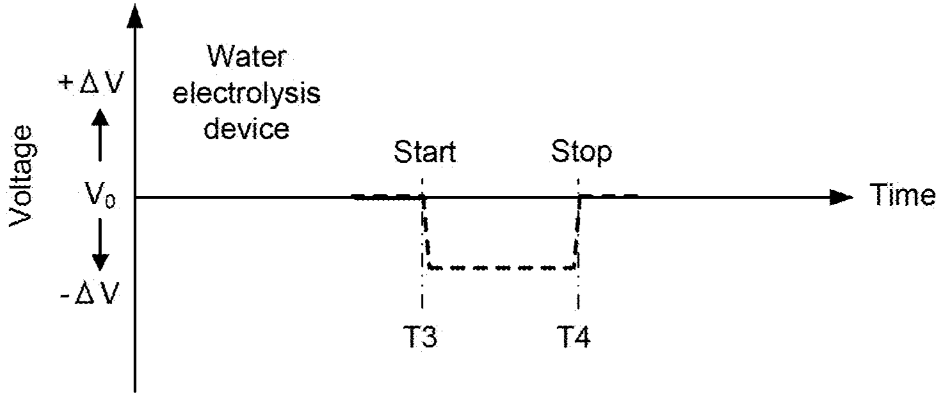
FIG. 5C is a schematic diagram showing a relationship between time and power in an electric power control system according to an embodiment of the present disclosure.

FIG. 5C is a schematic diagram showing a relationship between a voltage fluctuation and time in the driving of the water electrolysis device 41. As shown in FIG. 5C, when the water electrolysis device 41 is driven in a range from time T3 to time T4, the voltage decreases from the reference voltage $V_0$ by $-\Delta V$. In other words, driving the water electrolysis device 41 makes it possible to switch to a direction in which the voltage of the first DC bus line 100 in the electric power control system 1 is decreased (consuming power).

Figure 6A:
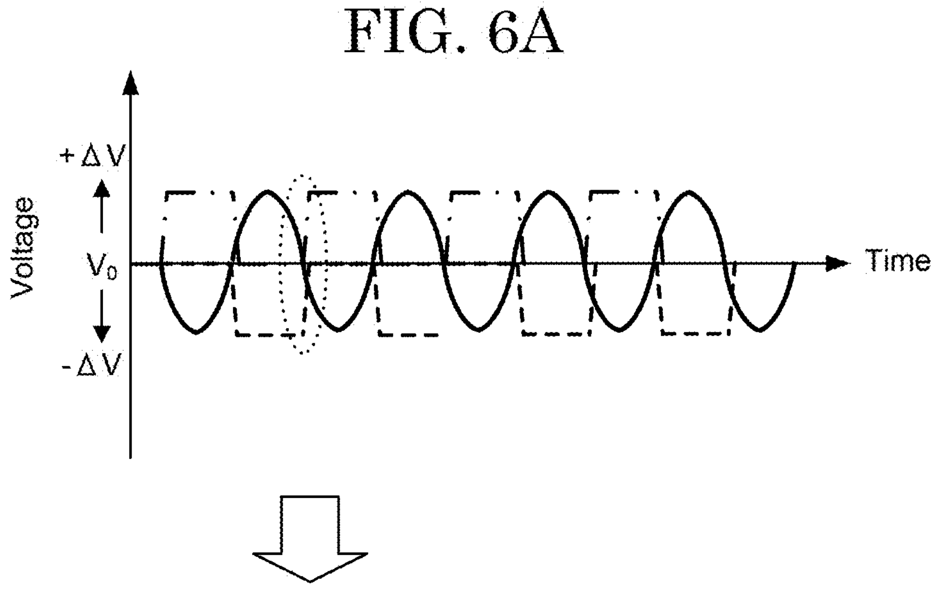
FIG. 6A is a schematic diagram showing a relationship between time and power in an electric power control system according to an embodiment of the present disclosure.
Figure 6B:
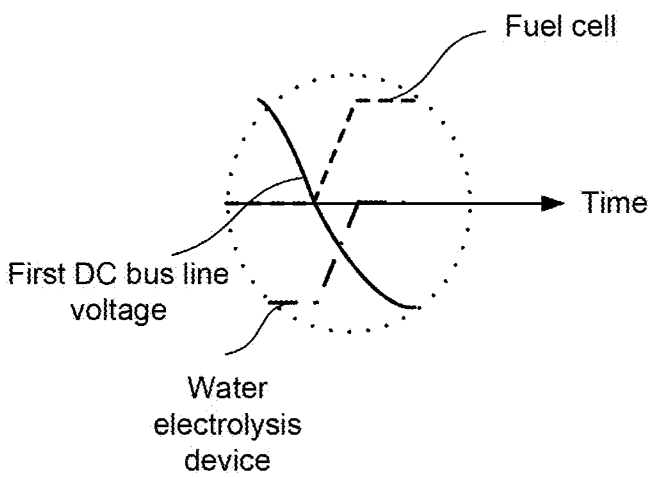
FIG. 6B is a schematic diagram showing a relationship between time and power in an electric power control system according to an embodiment of the present disclosure.

FIG. 6A and FIG. 6B are schematic diagrams in which the relationship between the voltage of the first DC bus line 100 and the time shown in FIG. 5A is combined with the relationship between the driving of the fuel cell and the water electrolysis device and the time shown in FIG. 5B and FIG. 5C. In the present embodiment, the control device 10 switches driving and termination of the fuel cell 51 and the water electrolysis device 41 depending on the voltage of the first DC bus line 100. Specifically, in the case where the voltage of the first DC bus line 100 is higher than the reference voltage $V_0$ and the electric power is excessive, the water electrolysis device 41 is driven to generate hydrogen. Conversely, in the case where the voltage of the first DC bus line 100 is lower than the reference voltage $V_0$ and the electric power is insufficient, the fuel cell 51 is driven to supply the electric power.

In this case, attention is paid to when the voltage of the first DC bus line 100 in FIG. 6A is switched from the voltage higher than the reference voltage $V_0$ to the voltage lower than the reference voltage $V_0$. In FIG. 6A, a part where the voltage of the first DC bus line 100 is switched from the voltage higher than the reference voltage $V_0$ to the voltage lower than the reference voltage $V_0$ is surrounded by a dotted line, and the surrounded area is shown in an enlarged view in FIG. 6B. In FIG. 6B, when the voltage of the first DC bus line 100 is switched from the voltage higher than the reference voltage $V_0$ to the voltage lower than the reference voltage $V_0$, there is a period during which an operation for switching off driving of the water electrolysis device 41 that is being driven when the voltage of the first DC bus line 100 is the high voltage overlaps an operation for switching on driving of the fuel cell 51 that is to be driven by the voltage being lower than the reference voltage $V_0$. In other words, when the voltage is switched as shown in FIG. 6B, since the aim is to keep the voltage of the first DC bus line 100 at the reference voltage $V_0$ at all times, the fuel cell 51 and the water electrolysis device 41 need to be driven simultaneously for a certain period. Specifically, when the voltage of the first DC bus line 100 is switched from the voltage higher than the reference voltage $V_0$ to the voltage lower than the reference voltage $V_0$, and the voltage of the first DC bus line 100 becomes lower than the reference voltage $V_0$ (step S103; No), the control device 10 transmits a signal instructing termination of the water electrolysis device 41 and driving of the fuel cell 51 to the water electrolysis device 41 and the fuel cell 51 (step S107). In this case, in the case of the water electrolysis device 41 and the fuel cell 51, if the electrochemical reaction inside is abruptly changed, there is a risk of breakage or a reduction in lifetime. Therefore, since it is desirable for the control device 10 to gradually change the voltage when driving or terminating the water electrolysis device and the fuel cell, there is a period during which the water electrolysis device 41 and the fuel cell 51 are simultaneously driven.

In addition, when the voltage of the first DC bus line 100 is switched from the voltage lower than the reference voltage $V_0$ to the voltage higher than the reference voltage $V_0$, and the voltage of the first DC bus line 100 becomes higher than the reference voltage $V_0$ (step S103; Yes), the control device 10 transmits a signal instructing termination of the fuel cell 51 and driving of the water electrolysis device 41 to the water electrolysis device 41 and the fuel cell 51 (step S105). Also in this case, as in the case where the voltage of the first DC bus line 100 changes from the voltage higher than the reference voltage $V_0$ to the voltage lower than the reference voltage $V_0$, if the electrochemical reaction inside the water electrolysis device 41 and the fuel cell 51 abruptly changes, there is a risk of breakage or a reduction in lifetime. Therefore, since it is desirable for the control device 10 to gradually change the voltage when driving or terminating the water electrolysis device and the fuel cell, a period of time occurs when the water electrolysis device 41 and the fuel cell 51 are simultaneously driven.

After transmitting each instruction signal to the water electrolysis device 41 and the fuel cell 51 (step S105, step S107), the control device 10 loops to a process of acquiring the voltage (voltage value) of the first DC bus line (step S101).

In the period during which the water electrolysis device 41 and the fuel cell 51 are simultaneously driven as described above, in FIG. 1, the electric power output from the fuel cell 51 is supplied to the first DC bus line 100 and is simultaneously supplied to the water electrolysis device 41 via the second DC bus line 200. The situation in this case is shown in FIG. 7.

Figure 11:
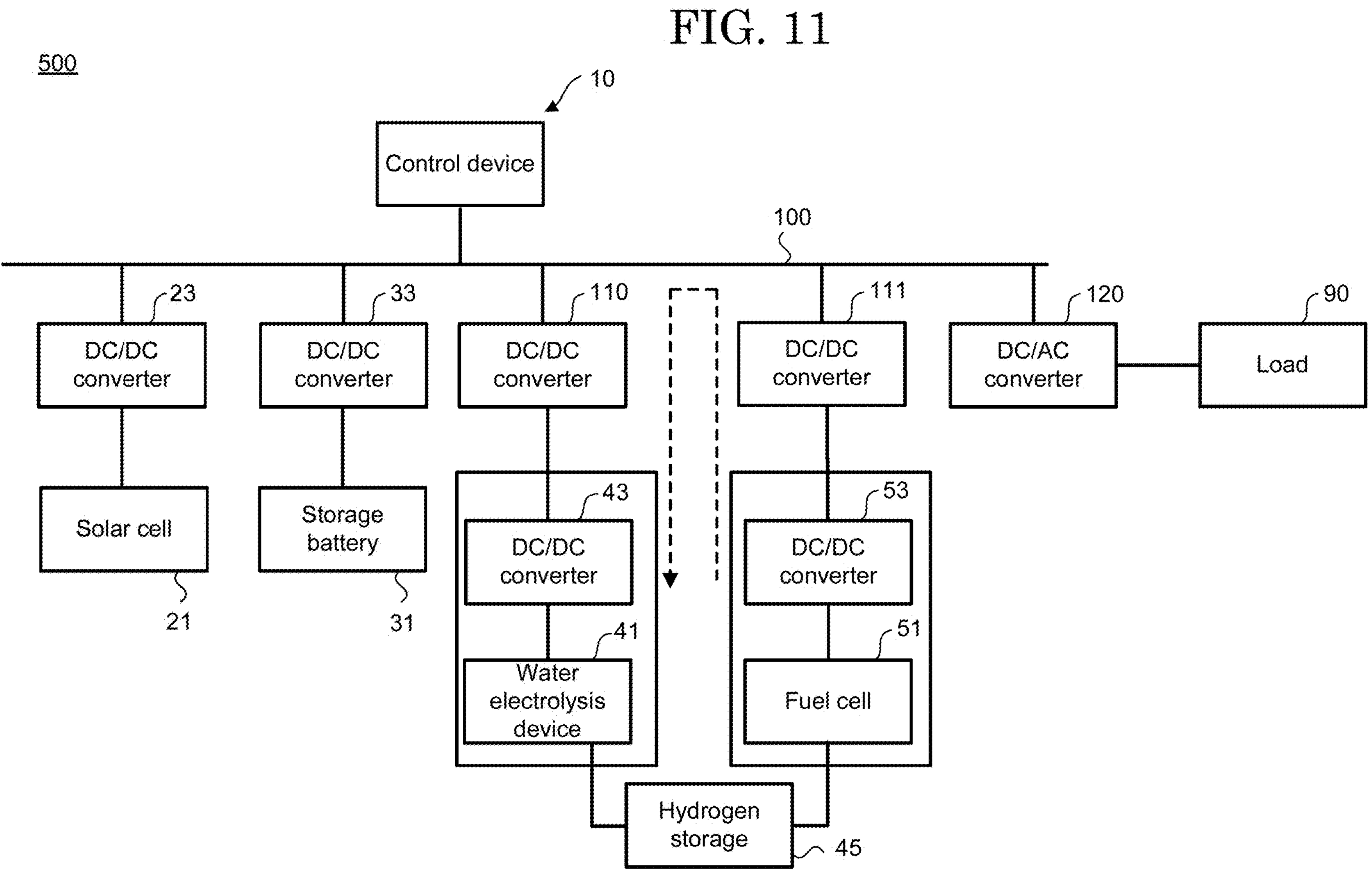
FIG. 11 is an overall configuration diagram of a conventional electric power control system.

In this case, a conventional electric power control system and the electric power control system according to the present embodiment will be compared. FIG. 11 is a configuration diagram of a conventional electric power control system 500. The conventional electric power control system does not include the second DC bus line 200 as shown in FIG. 1 of the present application. The specification voltage value in the water electrolysis device and the fuel cell may be lower than the voltage value of the DC current flowing through the first DC bus line 100 by about 20 times or more. In this case, since it is difficult to perform voltage conversion in one DC/DC converter, in the conventional electric power control system, as shown in FIG. 11, two converters, namely, the DC/DC converter 110 and the DC/DC converter 43 are arranged between the first DC bus line 100 and the water electrolysis device 41. Similarly, two converters, a DC/DC converter 111 and the DC/DC converter 53 are arranged between the first DC bus line 100 and the fuel cell 51.

Therefore, in a period during which the water electrolysis device 41 and the fuel cell 51 are simultaneously driven, the electric power is supplied from the fuel cell 51 to the water electrolysis device 41 via the four DC/DC converters (the DC/DC converters 53, 111, 110, and 43). In this case, in each converter, electric power loss occurs when the voltage is converted. As a result, in the conventional electric power control system, since the four DC/DC converters are required, the number of times the voltage was converted by the DC/DC converter reached four, resulting in significant power loss.

Figure 7:
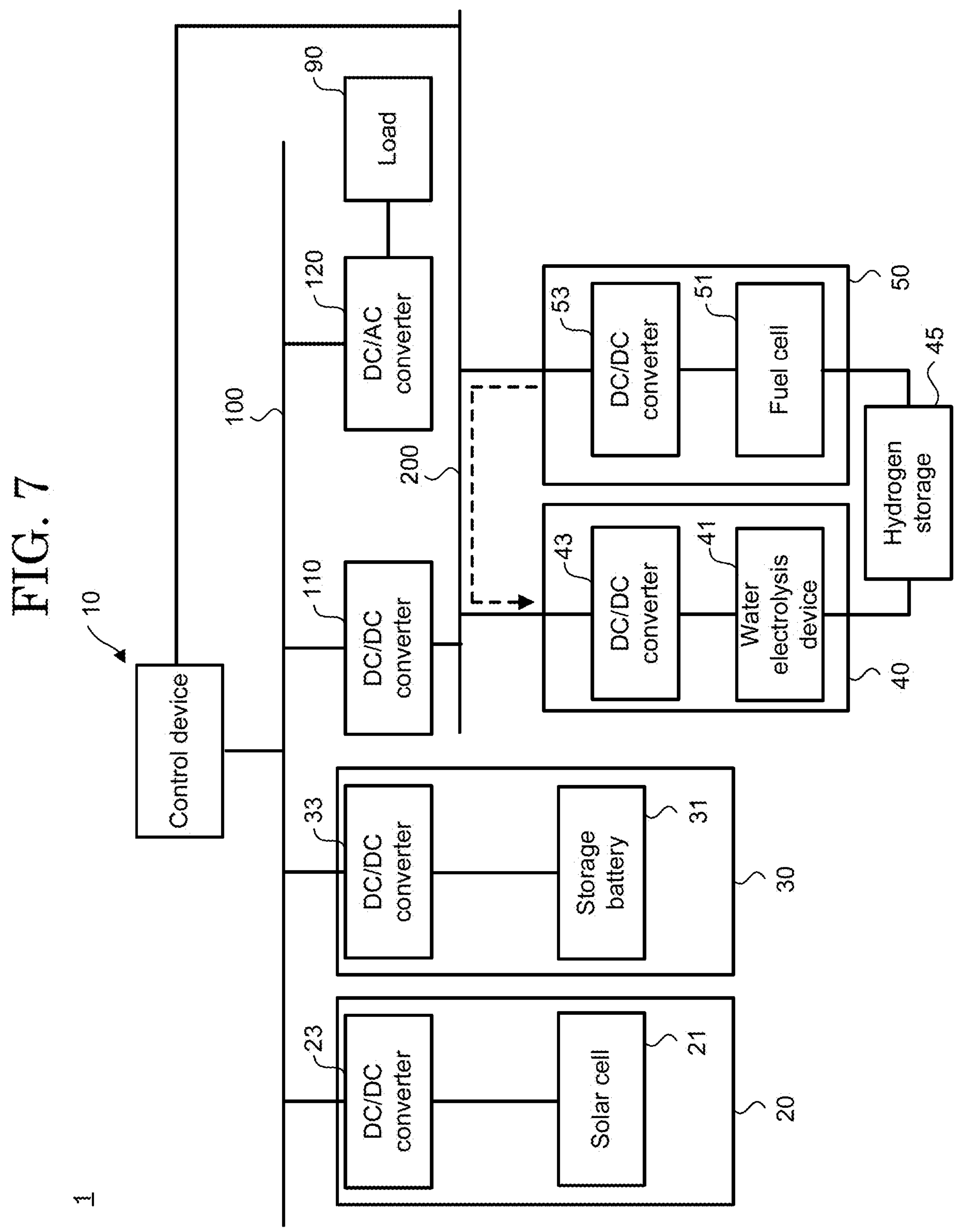
FIG. 7 is a schematic diagram showing a flow of power in the electric power control system according to an embodiment of the present disclosure.

However, in the present embodiment, as shown in FIG. 7, the water electrolysis unit 40 and the fuel cell unit 50 are connected in parallel to the second DC bus line 200. In the case where the water electrolysis device 41 and the fuel cell 51 are simultaneously driven, when the electric power from the fuel cell flows to the water electrolysis device, the electric power passes through the second DC bus line 200 without passing through the first DC bus line 100. As a result, the number of times the voltage was converted by the DC/DC converter can be reduced to two, resulting in the reduction of the electric power loss. In other words, by using the present embodiment, it is possible to stabilize electric power while suppressing electric power loss.

Second Embodiment

In the present embodiment, an electric power control system different from the first embodiment will be described. Specifically, an example in which a device other than the water electrolysis device 41 and the fuel cell 51 is connected to the second DC bus line will be described.

2-1. Configuration of Electric Power Control System 1A

Figure 8:
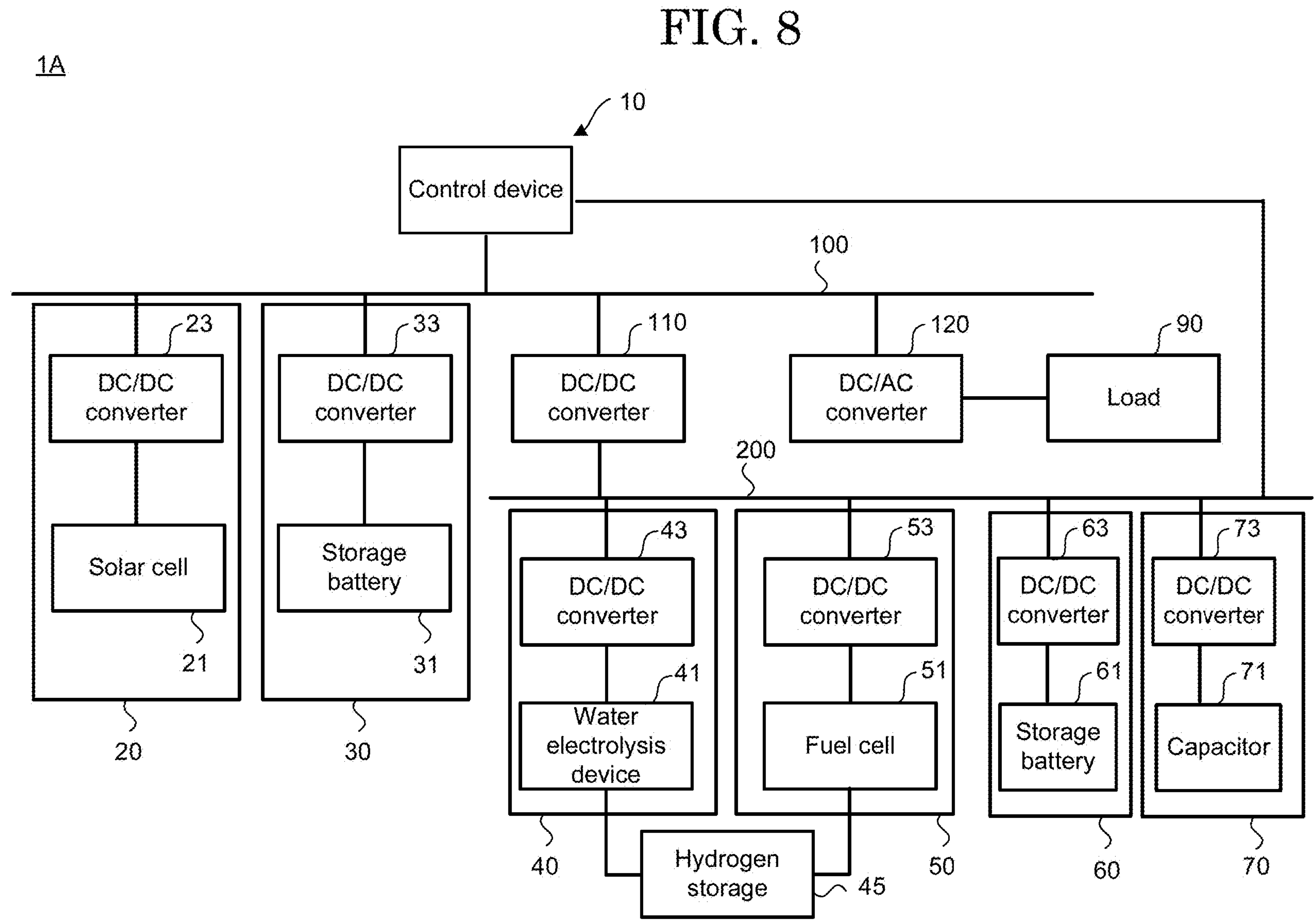
FIG. 8 is an overall configuration diagram of an electric power control system according to an embodiment of the present disclosure.

FIG. 8 is an overall configuration diagram of an electric power control system 1A according to the present embodiment. As shown in FIG. 8, the electric power control system 1A may include a storage battery unit 60 and a capacitor unit 70 in addition to the control device 10, the solar power generation unit 20, the storage battery unit 30, the water electrolysis unit 40, the fuel cell unit 50, the first DC bus line 100, the second DC bus line 200, the DC/DC converter 110, and the DC/AC converter 120, and the load 90.

In the present embodiment, in addition to the water electrolysis unit 40 and the fuel cell unit 50, the storage battery unit 60 and the capacitor unit 70 are connected to the second DC bus line 200.

The storage battery unit 60 includes a storage battery 61 and a DC/DC converter 63. The storage battery 61 stores electric power generated by the electric power control system 1A. The DC/DC converter 63 converts the voltage value of the DC current flowing through the second DC bus line 200 so as to match the specified voltage of the storage battery 61 in order to store the surplus electric power in the electric power control system 1A in the storage battery 61.

The capacitor unit 70 includes a capacitor 71 and a DC/DC converter 73. The capacitor 71 stores electric power generated by the electric power control system 1A. The DC/DC converter 73 converts the voltage value of the DC current flowing through the second DC bus line 200 to match a specified voltage of the capacitor 71 in order to store the surplus power in the electric power control system 1A in the capacitor 71.

In the above description, the electric power control system 1A includes an electric power storage mechanism for storing electric power, such as the storage battery 61 and the capacitor 71 connected to the second DC bus line 200. As a result, the electric power generated by the fuel cell 51 can be stored in the storage battery 61 or the capacitor 71, and the number of times of a voltage is converted can be reduced as compared with the case where the electric power is stored in the storage battery 31. Therefore, by using the present embodiment, it is possible to stabilize electric power while suppressing electric power loss.

Furthermore, in the present embodiment, other electrical devices, in addition to the storage battery unit 60 and the capacitor unit 70, may be directly connected to the second DC bus line 200.

Third Embodiment

In the present embodiment, an electric power control system different from the second embodiment will be described. Specifically, the DC/AC converter is connected to the second DC bus line 200, and a method of supplying electric power to a load will be described.

3-1. Configuration of Electric Power Control System 1B

Figure 9:
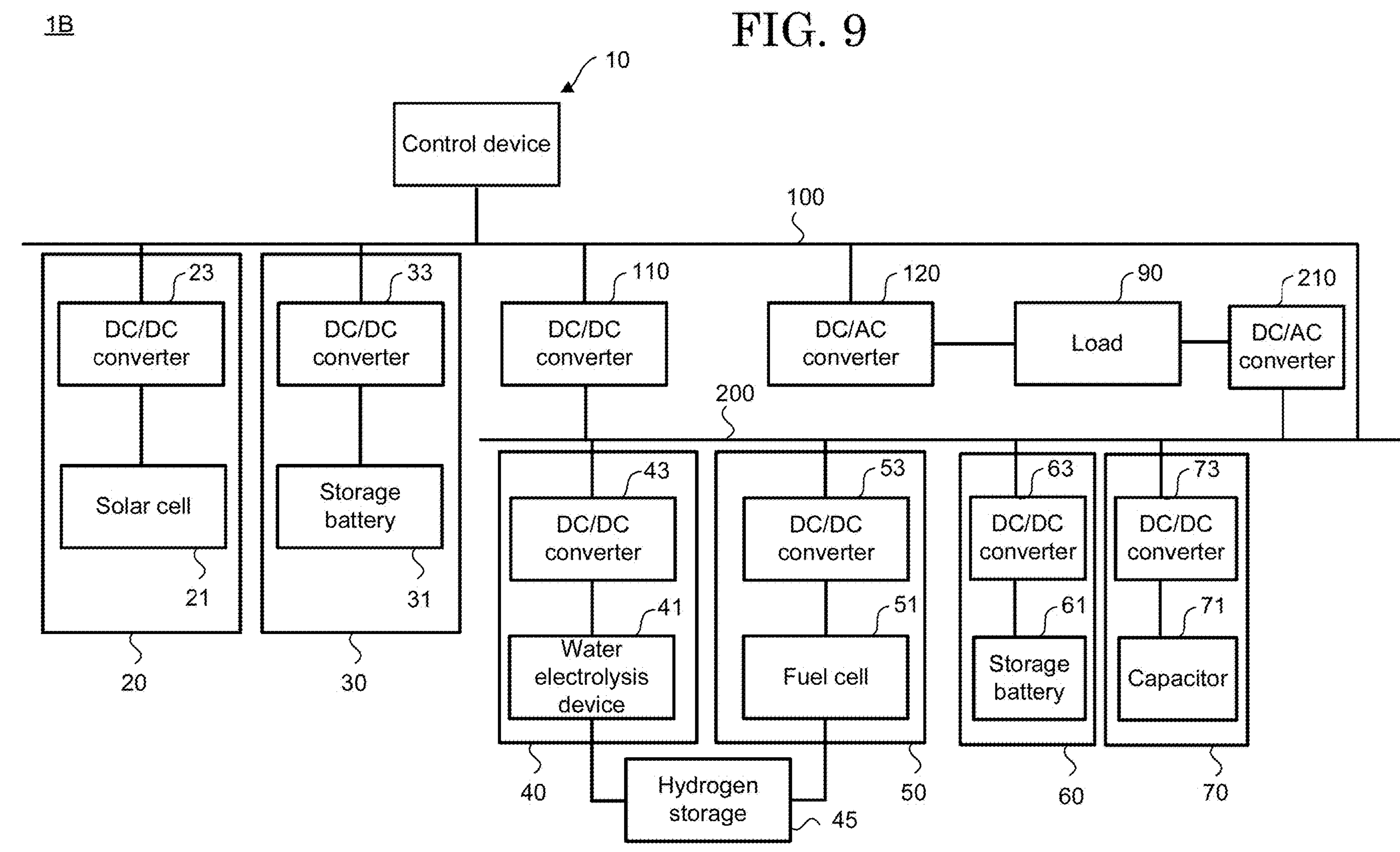
FIG. 9 is an overall configuration diagram of an electric power control system according to an embodiment of the present disclosure.

FIG. 9 is an overall configuration diagram of an electric power control system 1B according to the present embodiment. As shown in FIG. 9, the electric power control system 1B may include a DC/AC converter 210 in addition to the control device 10, the solar power generation unit 20, the storage battery unit 30, the water electrolysis unit 40, the fuel cell unit 50, the first DC bus line 100, the second DC bus line 200, the DC/DC converter 110, the DC/AC converter 120, the load 90, the storage battery unit 60, and the capacitor unit 70.

In the present embodiment, in addition to the water electrolysis unit 40, the fuel cell unit 50, the storage battery unit 60, and the capacitor unit 70, the DC/AC converter 210 may be connected to the second DC bus line 200.

The DC/AC converter 210 converts the DC current flowing through the second DC bus line 200 into an AC current, and supplies the AC current to the load 90.

3-2. Electric Power Control Method

Figure 10:
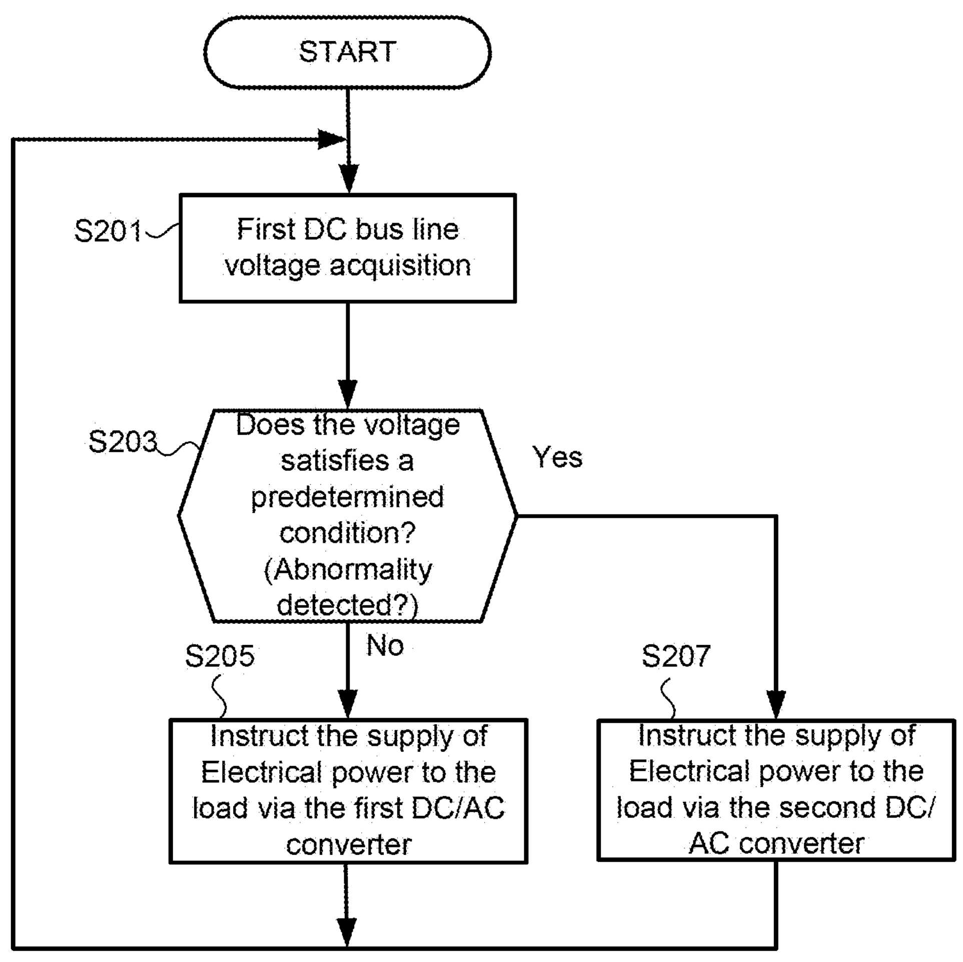
FIG. 10 is a flowchart of a control method according to an embodiment of the present disclosure.

Next, the electric power control method will be described. FIG. 10 is a flowchart of the electric power control method.

The control device 10 acquires the voltage value of the first DC bus line 100 (step S201). The control device 10 constantly acquires and monitors the voltage value (power value).

Next, the control device 10 determines whether the voltage of the first DC bus line satisfies the predetermined condition (step S203). Specifically, the presence or absence of an abnormality in the electric power control system 1B is determined. The abnormality in this case includes an emergency such as a momentary low voltage or a power failure.

Under normal conditions, in other words, no abnormality is detected (step S203; No), the control device 10 instructs the supply of electrical power to the load 90 via the DC/AC converter 120 (also referred to as a first DC/AC converter) (step S205).

If an abnormality is detected (step S203; Yes), the control device 10 instructs the supply of electrical power to the load 90 via the DC/AC converter 210 (also referred to as a second DC/AC converter) (step S207).

By using the present embodiment, in the case where an abnormality is detected in the electric power control system, the second DC bus line can be used as an emergency power source, and stable power can be supplied in an emergency.

Modification

Within the spirit of the present disclosure, it is understood that various modifications and changes can be made by those skilled in the art and that these modifications and changes also fall within the scope of the present disclosure. For example, the addition, deletion, or design change of components, or the addition, deletion, or condition change of processes as appropriate by those skilled in the art based on each embodiment are also included in the scope of the present disclosure as long as they are provided with the gist of the present disclosure.

In addition, although an example in which the electric power control system includes the solar power generation unit has been described in the first embodiment of the present disclosure, the present disclosure is not limited to this. For example, instead of the solar power generation unit, a unit having an electric power generation mechanism that uses wind, geothermal, biomass, hydroelectric, temperature differential, or other renewable energy, may be used or a combination of these electric power generation mechanisms may be used, as appropriate.

Although an example in which the fuel cell is used as the power generation apparatus and the water electrolysis device is used as the power generation fuel generation apparatus has been described in the first embodiment of the present disclosure, the present disclosure is not limited to this. For example, an engine such as an internal combustion engine or an external combustion engine may be used as the power generation apparatus.

Although an example in which one reference voltage ($V_0$) is used as the reference voltage in the power generation apparatus (fuel cell) and the power generation fuel generation apparatus (water electrolysis device) has been described in the first embodiment of the present disclosure, the present disclosure is not limited to this. The reference voltage of the power generation apparatus (fuel cell) and the power generation fuel generation apparatus (water electrolysis device) may have different values. In this case, it is possible to reduce the number of unnecessary start-stop operations due to small voltage fluctuations.

What is claimed is:

1. An electric power control system comprising:

an electric power generation mechanism configured to generate electric power by using renewable energy;

a first DC (Direct Current) bus line connected to the electric power generation mechanism and corresponding to a first voltage;

a DC/DC converter connected to the first DC bus line and configured to convert the first voltage into a second voltage lower than the first voltage;

a second DC bus line connected to the DC/DC converter and corresponding to the second voltage;

a power generation apparatus electrically connected to the second DC bus line; and a power generation fuel generation apparatus electrically connected to the second DC bus line and connected to the power generation apparatus, the power generation fuel generation apparatus being configured to generate fuel for use in power generation in the power generation apparatus, wherein the second DC bus line is a power distribution line shared by the power generation apparatus and the power generation fuel generation apparatus.

2. The electric power control system according to claim 1, wherein the electric power generation mechanism is a solar cell.

3. The electric power control system according to claim 1, further comprising:

an electric power storage mechanism connected to the second DC bus line and configured to store electric power generated by the electric power generation mechanism.

4. The electric power control system according to claim 1, wherein the power generation apparatus is a fuel cell, and the power generation fuel generation apparatus is a water electrolysis device.

5. The electric power control system according to claim 1, further comprising:

a control device configured to control driving and termination of the power generation apparatus and the power generation fuel generation apparatus depending on a voltage value of a DC current in the first DC bus line.

6. The electric power control system according to claim 5, further comprising:

a first DC/AC (alternating current) converter connected to the first DC bus line;

a second DC/AC converter connected to the second DC bus line; and a load connected to the first DC/AC converter and the second DC/AC converter, wherein when the first DC bus line satisfies a predetermined condition, the control device supplies power to the load via the second DC/AC converter.

7. The electric power control system according to claim 1, wherein the power generation apparatus and the power generation fuel generation apparatus are electrically connected in parallel to the second DC bus line.

8. The electric power control system according to claim 7, wherein, in a state where the power generation apparatus and the power generation fuel generation apparatus are simultaneously driven, electric power from the power generation apparatus is supplied to the power generation fuel generation apparatus through the second DC bus line without passing through the first DC bus line.

* * * * *